United States Patent [19]

Fisher et al.

[11] Patent Number: 5,023,278

[45] Date of Patent: Jun. 11, 1991

[54] PHOSPHONITRILIC POLYMERS WITH CURABILITY BY SULFUR ACCELERATED CURES OR RADIATION CURES

[75] Inventors: Hugh A. Fisher; Susan D. Landry, both of Baton Rouge, both of La.; Troy L. Smith, Jr., Kennesaw, Ga.

[73] Assignee: Ethyl Corporation, Richmond, Va.

[21] Appl. No.: 438,789

[22] Filed: Nov. 20, 1989

[51] Int. Cl.$^5$ .................................. C08J 9/00
[52] U.S. Cl. .......................... 521/85; 521/86; 521/88; 521/89; 521/92; 521/93; 521/134; 521/189; 528/399
[58] Field of Search ............. 521/89, 85, 86, 92, 521/93, 88, 189, 134

[56] References Cited

U.S. PATENT DOCUMENTS

| | | | |
|---|---|---|---|
| 4,107,108 | 8/1878 | Dieck et al. | 521/189 |
| 4,113,670 | 9/1978 | Dieck et al. | 521/189 |
| 4,535,095 | 8/1985 | Mueller | 521/189 |
| 4,536,520 | 8/1985 | Mueller | 521/189 |
| 4,602,048 | 7/1986 | Penton et al. | 521/189 |

Primary Examiner—Morton Foelak
Attorney, Agent, or Firm—Richard J. Hammond

[57] ABSTRACT

An improved process for producing sulfur-cured polyphosphazene foams is disclosed. The process comprises foaming more than one storable, stable accelerator base composition comprising the sulfur curing agent, a phosphazene oil and a polyphosphazene. A masterbatch of the same or similar polyphosphazene is made by mixing together a hydrated filler, processing aids and phosphazene oil. The matchbatch and accelerator base composition are then blended and foamed and cured.

12 Claims, No Drawings

PHOSPHONITRILIC POLYMERS WITH CURABILITY BY SULFUR ACCELERATED CURES OR RADIATION CURES

This invention relates to an improved process for producing polyphosphazene foams from compositions which possess exceptional stability and are easily foamed and cured. The invention also relates to useful articles produced from such process. More particularly, it is directed to non-fluorinated polyphosphazenes similar to the polyphosphazenes described in U.S. Pat. No. 3,856,713 issued Dec. 24, 1974 and to improvements thereon such as those described in U.S. Pat. Nos. 4,116,785 issued Sept. 26, 1978, 3,994,838 issued Nov. 20, 1976 and 4,152,314 issued May 1, 1979; the disclosures of which are incorporated herein by this reference.

One object of this invention is to provide an improved process for producing polyphosphazene foams having curative sites which contain unsaturation and which can be sulfur cured.

Another object of the invention is to provide an improved process for curing and foaming phosphazene terpolymers and to provide procedures and formulations whereby the raw gums comprising said polyphosphazenes are incorporated into compositions from which useful articles with outstanding properties are obtained.

A further object of the invention is to provide an improved process for producing foam compositions and articles which exhibit excellent low temperature flexibility and good physical strength over an extremely broad range of service conditions.

These and other objects of the invention are achieved by providing sulfur based cures for phosphazene polymers containing small but significant amounts of unsaturation in some of the substituents attached to the P atoms of the —P=N— chain, in addition to saturated substituents including alkoxy, cycloalkoxy, aryloxy, arylalkoxy, alkyl substituted aryloxy, and otherwise substituted aryloxy and/or alkoxy groups attached to the P atoms, a particularly preferred unsaturated substituent being an o-allyl phenoxy group. In the preferred embodiment of the invention, 0.1–5% by weight of groups containing some unsaturation are randomly distributed among the saturated groups attached to the —P=N— polymer backbone.

Briefly, the invention contemplates an improved process for the sulfur accelerated cures of phosphazene polymers in which most of the chlorine atoms in linear $(NPCl_2)_n$ polymer have been replaced with substituents such as those described in the prior art noted above, e.g., alkoxy, and/or aryloxy groups which may be substituted in the manner taught in the United States patents noted above, and the replacement of the remaining chlorine atoms in linear $(NPCl_2)_n$ polymer with substituents which possess at least some unsaturation which will serve as a cure site.

The following structural formula may be taken as one way of illustrating the polyphosphazenes useful in the present invention, although it is to be understood that the distribution of the Q, Q' and Q" groups may be regular or irregular and that the phosphazene polymer may be either linear or branched:

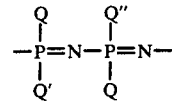

in which Q, Q' and Q" represent monovalent groups randomly distributed along the —P=N— backbone. The Q and Q' groups are preferably substituted or unsubstituted alkoxy or aryloxy groups which are relatively inert or unreactive to sulfur curing accelerators as compared to the Q" groups which contain some unsaturation, the total of Q and Q' groups being sufficient to replace at least 90% and preferably at least 95% but not more than 99.9% of the Cl atoms originally present in the linear $(NPCl_2)_n$ polymer. The Q" groups are groups with some unsaturation, e.g., alkenyl groups such as vinyl, allyl, crotyl, or the like, the number of Q" groups distributed randomly in the phosphazene being preferably between 0.1% and 5% of the total of Q plus Q' plus Q". The Q and Q' groups may be either the same or they may differ and each may represent more than one saturated group.

The phosphazene polymer described above serves two functions for the improved process of the present invention. In one case it provides the continuous phase for stable and storable accelerator base compositions. It also acts as the main ingredient in a masterbatch formulation in which such accelerator base compositions are blended prior to foaming and curing.

The accelerator base composition comprises, in addition to the phosphazene polymer noted above, a cyclic, linear or mixture of cyclic and linear phosphazene oil of the formula

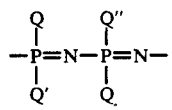

where Q and Q' are the same or different and are $C_1$ to $C_{12}$ linear or branched alkoxy or $C_6$ to $C_{10}$ aryloxy unsubstituted or substituted with $C_1$ to $C_6$ linear or branched alkyl. Q" is a group of the formula —O—R—R' where R is alkylene or arylene and R' is a group having olefinic unsaturation. Q" is from about 0.1 mole % to about 5.0 mole % of the total of Q+Q'+Q". The phosphazene oil, typically present in the accelerator base composition from about 5% by weight to 55% by weight, is of relatively low molecular weight. It has a Mn of from about 700 to about 500,000 as determined by GPC. Preferably the oil is used in the accelerator base composition at concentrations of 7 to 20%, most preferably 10–15%.

In addition to the polymer and the oil, each of the accelerator base compositions in order to be shelf stable and storable must have a single sulfur-containing curing agent. Such compounds are well known in the prior art and are listed for example in Morton's Rubber Technology, Second Edition, published 1973 by van Nostrand-Reinhold Co. (N.Y.). Typical classes of such accelerators (curing agents) include 2-mercaptobenzothiazole and derivatives, dithiocarbamate and derivatives, dithiophosphates, thioureas, etc. Preferably accelerators classified as dithiocarbamate derivatives and benzothiozole derivatives are used in the process of this invention. Most preferred accelerators are the metallic salts of the dithiocarbamates and the sulfur-substituted benzothiozoles. While these compounds when freshly blended with masterbatch phosphazene polymer are effective curing agents, stored combinations of such materials lose their effectiveness when aged for as little as 24 hours. In the process of the present invention, each accelerator/curing agent is blended in its own accelerator base composition and stored for times that can be longer than two years without losing their ability to effectively cure the phosphazene masterbatch described below.

In a typical process, about 25% to about 80% by weight of the total accelerator base composition comprises the curing agent and about 10% to about 15% is the continuous phase phosphazene polymer. Most preferably the concentrations are 70 to 75% and 15-20% respectively. Typically, more than one and up to four or more of the accelerator base compositions can be blended, usually by milling, with the masterbatch described below. The total amount of the accelerator base compositions in the masterbatch can range from about 15% by weight to about 25% by weight of the total (combined). The amount of each accelerator base composition in the combination of accelerator bases is usually not less than 5% by weight to about 95% by weight of the total amount of accelerator base used. However, the exact amount of each accelerator base composition in the total amount of accelerator base composition is normally adjusted (by small lot trial and error experiments) to give the best cures and lowest density foams.

The masterbatch composition into which at least two accelerator base compositions are blended comprises chiefly the linear phosphazene polymer disclosed earlier combined with a thermally decomposible filler such as magnesium carbonate, Dawsonite, magnesium hydroxide, hydrated alumina or mixtures of such compounds. The use of such fillers is well known and described in U.S. Pat. No. 4,064,095 incorporated herein by reference. These fillers are typically employed in the masterbatch at concentrations in the range of 150 to 220 parts per 100 parts of phosphazene polymer. Preferably the concentrations are 175-200, most preferably 180-190 parts for each 100 parts of polymer.

Processing aids are also required to be added to the masterbatch to achieve successful low density, cured foams. These materials, used to facilitate the compounding of the polymer with the filler and subsequently with the accelerator bases, are preferably a combination of metallic soap and silica filled polysiloxane. The latter compounds ar preferably aryldimethylpolysilioxanes and include vinyl, phenyl or other aryl substituents. The most preferred of these types of processing aid is Silastic ®HA-2. The metallic soap component is preferably a stearate, most preferably zinc stearate. The total amount of each processing aid should be between 1 and 125 parts per 100 parts of polymer (phr). Preferably, each is used in the range of 3-11 phr with 10 phr for each being particularly preferred.

As a further processing facilitator useful in the masterbatch composition, the cyclic, linear or mixed cyclic and linear phosphazene oil used as a component of the accelerator base compositions is also necessary to improve processing and enhance the final physical properties of the cured foam. This material is milled into the masterbatch formulation at 1-50 phr, preferably 5-25 phr, most preferably 10-15 phr.

Blowing agents and, if required, any activator for such materials are used in the masterbatch composition at concentrations of about 1-70 phr. The hydrazene-base blowing agents are preferred in the composition used in the present invention.

In addition to the above mentioned fillers, processing aids and blowing agent, other additives which may be present in the masterbatch formulation include foam stabilizing agents, pigments and vulcanizing aids.

The stabilizing agents found useful in the composition herein are the poly(ethylene oxide) compounds of relatively low molecular weight. Preferably these polymers are useful in the molecular weights of from 500 to 1000 at concentrations of about 0.2 to 5.0 phr, preferably 0.5 to 4 phr, most preferably 1-3 phr.

Vulcanizing aids, such as elemental sulfur and pigments are also useful in masterbatch formulation each at about 1 to 15 phr.

A preferable masterbatch formulation is shown below:

| Compound | Parts |
|---|---|
| Phosphazene Polymer | 100 |
| Hydrated Alumina | 175-200 |
| Zinc Stearate | 3-11 |
| Polysiloxane HA-2 | 3-11 |
| Poly(ethylene oxide) | 0.5-4 |
| Phosphazene Oil | 5-25 |
| Blowing Agent | 5-50 |
| Pigment | 10 |
| Vulcanizing Aid | 1.25 |

A typical preparation of the starting materials for use in the process of this invention is shown below.

(a) Preparation of Sodium Aryloxides

The amounts of reactants (based on 200 g of $(NPCl_2)_n$ chloropolymer) are calculated as follows, 200 g of chloropolymer being considered equivalent to 200/116, i.e., 1.72 moles $(NPCl_2)_n$:

Theory for aryloxides: 2 moles/mol of $(NPCl_2)_n = 3.44$ moles $(2 \times 1.72)$ Actual amount of aryloxides provided: 3.82 mole (11% excess)

Amount of sodium provided: 3.83 mole (88 g)

The following amounts of phenols were provided:
phenol: 194 g (60%)
p-ethylphenol: 207.4 g (50%)
o-allylphenol: 56 g (12%)

The phenols and sodium are weighed separately into bottles in which they are mixed with anhydrous tetrahydrofuran (THF) and capped. These operations are carried out in a Dry-Box. About 1200 ml of THF was added to the phenols and about 150 ml of THF was added to the sodium.

The Na/THF was added to a three-necked flask equipped with a stirrer, dropping funnel and an argon or nitrogen purge line. Under the purge atmosphere, the phenols in THF were added dropwise with stirring over about 2 hours at room temperature, the reaction being exothermic. After addition of the phenols, the reaction mixture was stirred at room temperature overnight. Generally, after 8 hours stirring the sodium had all reacted. A yellow to brown solution of the phenolates was obtained.

A similar preparation technique can be used for sodium alkoxides.

(b) Derivatization of $(NCPl_2)_n$ (i) Formation of Polyphosphazenes 200 g of linear $(NPCl_2)_n$ in benzene (total volume is about 2400 ml) is added (20 to 30 minutes) the alkyl or aryloxides prepared in a) in 1200 ml of THF and 2500 ml of benzene. The reaction mixture is then stirred at about 300° F. for twenty-four hours. Upon cooling, the polymer is coagulated by pouring into a ten gallon can containing two gallons of methanol with agitation. The solvents are then drawn off. Additional methanol may be added if the polymer does not separate cleanly from the solution. The solid, as free as possible of solvent, is then desalted by washing with water. The resulting chlorine-free polymer is dried at 50° to 60° C. under vacuum.

Some of the polyphosphazenes were compounded with the constituents shown in the tables which follow and press cured. The properties of the product are shown in Tables I and II.

(c) Formation of Phosphazene Oil

Typically, the procedure of the preparation of aromatic or aliphatic-substituted cyclophosphazene comprises the interaction of an organometallic compound with a cyclic halophosphazene $(NPCl_2)_x$ where x is 3 or 4. In such reaction, an organolithium reagent is allowed to react with a boiling diethyl ether solution of $(NPCl_2)_3$ in an atmosphere of dry nitrogen for several hours. The ether is removed by distillation and the residue vacuum distilled to give the cyclic phosphazene fully substituted with alkoxy or aryloxy groups. Such procedures is illustrated by the general reaction scheme taught by Moeller et al, Chem. Ind. (London) pg. 366 (1962).

EXAMPLES

Compounding

The phosphazene polymers and remaining additives were blended into a masterbatch formula in a Banbury ® mixer. The accelerator base compositions were mixed in a Brabender ® mixer but not added to the masterbatch until some later time. The examples below set out the storage periods of the accelerator base compositions prior to mixing with the masterbatch formulation. Each of the illustrative examples was blended and foamed by the procedure noted below. The resulting foams were tested as to either density, compression resistance, NBS smoke value and/or various parameters associated with Mooney viscosity. In the following examples, all additives are based on parts per 100 parts of polyphosphazene (phr).

Each of the accelerator base formulations was compounded as follows:

| Accelerator Base Composition | Accelerator Used |
|---|---|
| Tan Base | Piperidinium pentamethylene dithiocarbamate |
| Red Base | Zinc dimethyldithiocarbamate |
| Blue Base | Zinc dibutyldithiocarbamate |
| Brown Base | Benzothiazyl disulfide | were each mixed with phosphazene oil, and polyphosphazene and the above accelerators in the ratio 75:10:15 respectively. The examples following are based on phr of each of the compounded base formulations used as indicated.

TABLE I

| Example | 1 | 2 | 3 | 4 | 5 |
|---|---|---|---|---|---|
| Accelerator Base | | | | | |
| Tan Base | 2.7 | 2.7 | 2.7 | 2.7 | 2.7 |
| Red Base | 0.7 | 0.7 | 1.6 | 1.6 | 1.6 |
| Blue Base | 0.7 | 0.7 | 0.7 | 0.7 | 0.7 |
| Brown Base | 0.7 | 0.7 | .7 | .7 | .7 |
| Masterbatch Formulation | | | | | |
| Polyphosphazene | 100 | 100 | 100 | 100 | 100 |
| Hydrated alumina | 184 | 184 | 180 | 180 | 180 |
| Silastic ® HA-2 | 10 | 10 | 10 | 10 | 10 |
| Zinc stearate | 10 | 10 | 10 | 10 | 10 |
| Carbowax ® 3350 | 2 | 2 | 2 | 2 | 2 |
| Phosphazene Oil (50% o-allylphenoxy) | 12 | — | — | — | — |
| Phosphazene Oil (no unsaturation) | — | 12 | 10 | 8 | 6 |
| Blowing Agent | 26 | 26 | 25 | 25 | 25 |
| Sulfur | 1.27 | 1.27 | 1.25 | 1.25 | 1.25 |
| Pigment | 10 | 10 | 10 | 10 | 10 |
| Density, pds/ft$^3$ | 4.6 | 4.5 | — | — | — |
| Compression Resistance, psi | 1.5 | 1.6 | — | — | — |
| NBS Smoke Value, flaming mode (avg) | 85 | 87 | — | — | — |
| M (1 + 30) at 212° F. minimum | 24.8 | 24.1 | 25.5 | 26.5 | 27.3 |
| $t_5$ (min) | 8.2 | 7.5 | 6.9 | 7.2 | 7.7 |
| $t_{10}-t_5$ (min) | 2.6 | 2.7 | 2.4 | 2.6 | 2.7 |

TABLE II

| | Examples | |
|---|---|---|
| | 6 | 6A |
| Accelerator Base | | |
| Tan Base | 2.6 | 2.6 |
| Red Base | 0.7 | 0.7 |
| Blue Base | 1.3 | 1.3 |
| Brown Base | 0.7 | 0.7 |
| Masterbatch | | |
| Same as Table I | | |
| ML (1 + 30) at 212° F. | | |
| Minimum | 18.9 | 18.5 |
| $t_5$ (min) | 14.0 | 13.7 |
| $t_{10-5}$ | 5.4 | 5.6 |
| ML (1 + 20) at 275° F. | | |
| Minimum | 11.5 | 11.7 |
| $t_5$ (min) | 3.5 | 3.8 |
| $t_{10-5}$ (min) | 2.4 | 2.6 |

In the above examples, compositions of Example 6A were aged for 18 months prior to testing and compositions of Example 6 were freshly prepared. The data are substantially identical to an identical formula freshly prepared and tested.

TABLE III

| | 7 | 8 | 9 | 10 | 11 | 12 | 13 | 14 |
|---|---|---|---|---|---|---|---|---|
| Accelerator Base | | | | | | | | |
| Tan Base | 2.7 | 2.7 | 5.3 | .5.3 | — | — | — | — |
| Red Base | 0.66 | 0.66 | — | — | 5.3 | 5.3 | — | — |
| Blue Base | 0.66 | 0.66 | — | — | — | — | 5.3 | 5.3 |
| Brown Base | 0.73 | 0.73 | | | | | | |

TABLE III-continued

|  | 7 | 8 | 9 | 10 | 11 | 12 | 13 | 14 |
|---|---|---|---|---|---|---|---|---|
| ML (1 + 20) at 212° F. | | | | | | | | |
| Minimum | 22.5 | 23.1 | 20.9 | 20.1 | 23.7 | 23.0 | 21.5 | 21.3 |
| $t_5$ (min) | 11.55 | 11.1 | 16.2 | 17.2 | 12.15 | 12.75 | 9.45 | 9.7 |
| $t_{20}$ (min) | 15.6 | 14.91 | — | — | 13.9 | 14.61 | 10.8 | 11.1 |
| $t_{10-5}$ (min) | 4.05 | 3.8 | — | — | 1.74 | 1.86 | 1.35 | 1.3 |

Brown base in Examples 7 and 8 was aged 6 months. Tan, Red and Blue bases in Example 7 were freshly prepared.
Examples 8, 10, 11 and 14 were aged for 6 months prior to testing. They give physical properties substantially identical to freshly prepared samples (Examples 7, 9, 12 and 13).
$t_5$, $t_{10}$ and $t_{10-t_5}$ are taken from ML (1 + 20) at 212° F.

EXAMPLES 15-22

Accelerator base compositions were mixed in a Brabender prep-mixer for 5 minutes and passed through a 2-roll mill (room temperature) 10 times. Two or more of these accelerator base compositions were then mixed with a masterbatch formulation first by blending on a 2-roll mill (room temperature) and then further mixing on a 1¼″ vacuum vented extruder at 45 RPMs with 4 zone heating at zone temperatures of about 120°, 157°, 131° and 100° F. (hopper to die).

The masterbatch formulation used in the following examples is as follows:

| Masterbatch | |
|---|---|
| Polymer Phosphazene* | 100 |
| Hydrated Alumina | 180 |
| Zinc Stearate | 10 |
| Silastic ® HA-2 | 10 |
| Carbowax ® 3350 | 2 |
| Celogen ® AZ-130 | 25 |
| Carbon Black (N-990) | 10 |
| Sulfur | 1.25 |
| Phosphazene oil** | 12 |

*Polymer is a terpolymer comprising the substituents: phenoxy, p-ethylphenoxy and o-allyphenoxy, the latter about 6.5% of total substituents
**Oil is mixed cyclic and linear trimer phosphazene substituted with phenoxy, p-ethylphenoxy and o-allylphenoxy, the latter about 50% of the total substituents.

The accelerator base formulation used in the following examples is as follows:

| Accelerator Base Formulations (Grams) | | | | |
|---|---|---|---|---|
| Example | A | B | C | D |
| EYPEL ® -A Elastomer | 45 | 45 | 45 | 45 |
| Vanax ® 552 | 225 | | | |
| Methyl Zimate ® | | 225 | | |
| Butyl Zimate ® | | | 225 | |
| Altax ® | | | | 225 |
| Trimer Oil | 30 | 30 | 30 | 30 |
| Red Pigment | | 1 | | |
| Blue Pigment | | | 1 | |
| Tan Pigment | 1 | | | |
| Brown Pigment | | | | 1 |

The accelerator bases were mixed in a Brabender ® prep-mixer for five minutes at 45 rpm and passed through a two-roll mill (water-cooled) ten times.

TABLE IV
SHELF LIFE DATA ON ACCELERATOR BASES

| Formulation | Composition | Examples | | | | | | | |
|---|---|---|---|---|---|---|---|---|---|
| | | 15 | 16 | 17 | 18 | 19 | 20 | 21 | 22 |
| | Masterbatch | 500 gm | 500 | 500 | 500 | 500 | 500 | 500 | 500 |
| A | Vanax ® 552 Base | 3.8[1] | 3.8[2] | 7.6[1] | 7.6[2] | — | — | — | — |
| B | Methyl Zimate Base[1] | .94 | — | — | — | — | 7.6 | — | — |
| C | Butyl Zimate Base[1] | .94 | — | — | — | — | — | 7.6 | — |
| B | Methyl Zimate Base[2] | — | .94 | — | — | 7.6 | — | — | — |
| C | Butyl Zimate Base[2] | — | .94 | — | — | — | — | — | 7.6 |
| D | Altax Base[2] | 1.03 | 1.03 | — | — | — | — | — | — |
| | ML (1 + 20)[3] | | | | | | | | |
| | Minimum[3] | 22.5 | 23.1 | 20.9 | 20.1 | 23.7 | 23.0 | 21.5 | 21.3 |
| | $t_5$ (min)[4] | 11.55 | 11.1 | 16.2 | 17.2 | 12.15 | 12.75 | 9.45 | 9.7 |
| | $t_{10}$ (min)[4] | 15.6 | 14.91 | — | — | 13.9 | 14.61 | 10.8 | 11.1 |
| | $t_{10}-t_5$ (min)[4] | 4.05 | 3.8 | — | — | 1.74 | 1.86 | 1.35 | 1.3 |

[1]Freshly prepared
[2]Aged six months
[3]Mooney viscosity (Mooney Units) after 1 minutes preheat and 20 minutes test time at 212° F.
[4]$t_5$ and $t_{10}$ time (minutes) to a 5 lb-in or 10 lb-in rise in torque above the minimum torque (Mooney Viscometer) Data was taken on the foam formulation (Masterbatch) that was accelerated with the bases listed in the table. No foam was actually made using this material.

TABLE V
FORMULATIONS AND MOONEY VISCOSITY DATA FROM A SHELF-LIFE STUDY ON ACCELERATOR BASES

| | Examples | |
|---|---|---|
| | 23 | 24 |
| | Freshly Prepared | Aged 18 months |
| Composition | Accelerator Bases | Accelerator Bases |
| Masterbatch | 341.0 gm | 341.0 gm |
| Vanax 552 Base | 2.60 gm | 2.60 gm |
| Methyl Zimate Base | .65 gm | .65 gm |
| Butyl Zimate Base | 1.30 gm | 1.30 gm |
| Altax Base | .72 gm | .72 gm |
| Mooney Viscosity* | | |
| Minimum | 18.9 | 18.5 |
| $t_5$ (minutes) | 13.95 | 13.65 |
| $t_{10}-t_5$ (minutes) | 5.4 | 5.55 |
| Mooney Viscosity** | | |
| Minimum | 11.5 | 11.7 |
| $t_5$ (minutes) | 3.51 | 3.75 |
| $t_{10}-t_5$ (minutes) | 2.4 | 2.55 |

*Mooney Units, at 212° F., after 1 minute PREHEAT and 30 minutes TEST TIME
**Mooney Units, at 275° F., after 1 minute PREHEAT and 20 minutes TEST TIME

COMPARATIVE EXAMPLE 1

Concentrate 1 was mixed containing the following ingredients:

| Concentrate Formulation | |
|---|---|
| EYPEL ® -A Elastomer | 100.0 gm |
| Hydrated Alumina | 10.0 gm |
| Silastic ® HA2 | 10.0 gm |
| Vanax ® 552 | 50.0 gm |
| Methyl Zimate ® | 12.5 gm |
| Butyl Zimate ® | 12.5 gm |
| Sulfur | 175.0 gm |
| Water | 9.4 gm |

The concentrate was mixed in a Brabender ® prep-mixer for five minutes at 20 rpm and passed through a two-roll mill (water-cooled) 20 times.

The comparative Masterbatch 1 was prepared with the following ingredients:

| | |
|---|---|
| EYPEL ® -A Elastomer | 372.5 gm |
| Hydrated Alumina | 819.0 gm |
| Zinc Sterate | 37.0 gm |
| Silastic ® HA2 | 37.0 gm |
| Carbowax ® 3350 | 7.4 gm |
| Celogen ® AZ-130 | 93.0 gm |
| TiO$_2$ | 29.6 gm |
| Trimer Oil | 46.6 gm |
| Water | .7 gm |
| Zinc Oxide | 9.3 gm |

The masterbatch was mixed in a Banbury ® mixer for nine minutes at 77 rpm and passed through a two-roll mill (water-cooled) five times.

After the concentrate 1 was aged for 7 days, 35.4 gm was blended with the masterbatch 1 on a two-roll mill (water-cooled) 40 times.

Pieces (approximately 23 gm each of three samples) of the accelerated compound were placed in a 230° F. precure press for 12–20 minutes and then placed in a 350° F. oven for 20 minutes. The results of this comparative example are as follows:

| | Time | | |
|---|---|---|---|
| Sample | 230° F. Precure (min) | 350° F. oven (min) | Foam Physicals |
| 1 | 20 | 20 | No foam, blister formation |
| 2 | 15 | 20 | No foam, bubble formed |
| 3 | 12 | 20 | No foam, bubble formation |

COMPARATIVE EXAMPLE 2

Concentrate 2 was mixed containing the following ingredients:

| Concentrate Formulation | |
|---|---|
| EYPEL ® -A Elastomer | 100.0 gm |
| Hydrated Alumina | 10.0 gm |
| Silastic ® HA2 | 10.0 gm |
| Vanax ® 552 | 76.7 gm |
| Methyl Zimate ® | 19.2 gm |
| Butyl Zimate ® | 19.2 gm |

The concentrate was mixed in a Branbender prep-mixer for five minutes at 30 rpm and passed through a two-roll mill (water-cooled) 40 times.

Masterbatch 2 contained the following ingredients:

| | |
|---|---|
| EYPEL ® -A Elastomer | 515.0 gm |
| Hydrated Alumina | 1133.0 gm |
| Zinc Sterate | 51.5 gm |
| Silastic ® HA2 | 51.5 gm |
| Carbowax ® 3350 | 10.3 gm |
| Celogen ® AZ-130 | 139.0 gm |
| TiO$_2$ | 41.2 gm |
| Sulfur | 23.2 gm |
| Trimer Oil | 51.5 gm |
| Water | 1.0 gm |

The masterbatch 2 was mixed in a Banbury ® mixer for five minutes at 77 rpm and passed through a two-roll mill (water-cooled) five times.

After the concentrate 2 was aged for ten days, 32.0 gm was blended with the masterbatch 2 on a two-roll mill (water-cooled) 40 passes.

A 23-gm piece of the accelerated compound was placed in a 230° F. precure press for 60 minutes and then in a 350° F. oven for 20 minutes. Acceptable foam could not be produced.

COMPARATIVE EXAMPLE 3

Concentrate 3 contained the following ingredients:

| | |
|---|---|
| EYPEL ® -A Elastomer | 100.0 gm |
| Hydrated Alumina | 10.0 gm |
| Silastic ® HA2 | 10.0 gm |
| Vanax ® 552 | 76.7 gm |
| Methyl Zimate ® | 19.2 gm |
| Butyl Zimate ® | 19.2 gm |

This concentrate was mixed in a Brabender ® prep-mixer for five minutes at 30 rpm and passed through a two-roll mill (water-cooled) 20 times.

The masterbatch 3 was prepared with the following ingredients:

| | |
|---|---|
| EYPEL ® -A Elastomer | 144.0 gm |
| Hydrated Alumina | 120.0 gm |
| Zinc Stearate | 14.4 gm |
| Silastic ® HA2 | 14.4 gm |
| Carbowax ® 3350 | 2.9 gm |
| Celogen ® 754 | 21.6 gm |
| TiO$_2$ | 11.5 gm |
| Sulfur | 5.0 gm |
| Trimer Oil | 7.2 gm |
| Water | .3 gm |

Masterbatch 3 was mixed in a Brabender ® mixer for five minutes at 60 rpm and passed through a two-roll mill (water-cooled) five times.

After concentrate 3 had aged for eight days, 4.5 gm was blended with masterbatch 3 on a two-roll mill (water-cooled) 40 passes.

A 23.0 gm piece of the accelerated compound was placed in a 230° F. precure press for 20 minutes and then placed in a 350° F. oven for 20 minutes. Acceptable foam could not be produced.

COMPARATIVE EXAMPLE 4

Another batch of concentrate (#4) was produced with the same formulation and processing conditions used to produce concentrate #3. Another batch of masterbatch (#4A) was produced with the same formulation and using the same processing conditions that were used to produce masterbatch #4.

On the same day the concentrate #4 and masterbatch #4A were produced, 4.5 grams of concentrate #4 were blended with masterbatch #4A on a two-roll mill (water-cooled) 40 passes.

Pieces (approximately 70 grams each) of the accelerated compound were placed in a 230° F. precure press for 20-25 minutes and then placed in a 350° F. oven for 30 minutes. The results of this experiment are as follows:

| Sample # | Precure Time (minutes) | Oven Time (minutes) | Results |
|---|---|---|---|
| 1 | 20 | 30 | Good Foam |
| 2 | 20 | 30 | Good Foam |
| 3 | 22 | 30 | Good Foam |
| 4 | 22 | 30 | Good Foam |
| 5 | 25 | 30 | Good Foam |

What is claimed is:

1. A process for producing a cured and foamed polyphosphazene composition comprised of a linear phosphazene polymer of the formula

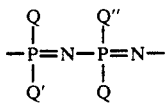

wherein Q and Q' are the same or different and are $C_1$ to $C_{12}$ linear or branched alkoxy of $C_6$ to $C_{10}$ aryloxy unsubstituted or substituted with $C_1$ to $C_6$ linear or branched alkyl and Q" is a group of the formula —O—R—R' where R is alkylene or arylene and R' is a group having olefinic unsaturation, the amount of Q" being from about 0.1 to about 5% of the total of Q, Q' and Q", said process comprising forming more than one storable, stable accelerator base composition comprising by weight 25-80% of an sulfur-containing curing agent, 5-45% of a cyclic, linear or mixture of cyclic or linear phosphazene oil of the formula

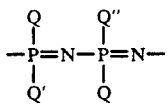

where Q, Q' and Q" are as previously defined having a molecular weight between about 700 and about 500,000 and 10-15% of said linear phosphazene polymer, each one of said more than one storable, stable accelerator base composition comprising a different sulfur-containing curing agent;

preparing a master batch comprising for each 100 parts by weight of said linear phosphazene polymer, between about 150 and about 220 parts by weight of a hydrated filler selected from the group consisting of magnesium hydroxide, hydrated alumina and mixtures thereof, from about 1 to about 125 parts by weight of a processing aid selected from the group consisting of a metallic soap, polysiloxane, polyethylene ether glycol and mixtures thereof, from about 1 to about 50 parts by weight of said cyclic, linear or mixture of cyclic and linear phosphazene oil and an effective amount of a blowing agent;

blending said masterbatch with at least two of said more than one accelerator base composition;

foaming and curing said composition.

2. The process of claim 1 wherein said masterbatch is blended with an accelerator base composition comprising a lower alkyl zimate and an accelerator base composition comprising an aromatic disulfide.

3. The process of claim 1 wherein said hydrated filler is hydrated alumina.

4. The process of claim 1 wherein said processing aid is a mixture of a metallic soap, polysiloxane and polyethylene ether glycol.

5. The process of claim 1 wherein Q and Q' in said phosphazene polymer are different and are $C_6$ to $C_{10}$ aryloxy unsubstituted or substituted with $C_1$ to $C_6$ linear or branched alkyl.

6. The process of claim 5 wherein R is arylene and R" is allyl.

7. The process of claim 1 wherein Q and Q' in said phosphazene oil are different and are $C_6$ to $C_{10}$ aryloxy unsubstituted or substituted with $C_1$ to $C_6$ linear or branched alkyl.

8. The process of claim 7 wherein R is arylene and R" is alkyl.

9. The process of claim 7 wherein Q and Q' in said phosphazene polymer are different and are $C_6$ to $C_{10}$ aryloxy unsubstituted or substituted with $C_1$ to $C_6$ linear or branched alkyl.

10. The process of claim 9 wherein R is arylene and R" is alkyl.

11. The process of claim 10 wherein about 15% to about 20% by weight of said more than one accelerator base composition is blended with said masterbatch.

12. The process in accordance with claim 1 wherein the total amount of said more than one accelerator base composition comprises from about 15 to about 25% by weight of the total composition.

* * * * *

UNITED STATES PATENT AND TRADEMARK OFFICE
CERTIFICATE OF CORRECTION

PATENT NO. : 5,023,278
DATED : June 11, 1991
INVENTOR(S) : Hugh A. Fisher, et. al.

It is certified that error appears in the above-identified patent and that said Letters Patent is hereby corrected as shown below:

In the Abstract, line 8, reads "matchbatch" and should read --masterbatch --.

Column 11, line 33 reads "alkoxy of $C_6$" and should read -- alkoxy or $C_6$ --.

Signed and Sealed this

Fifth Day of January, 1993

Attest:

DOUGLAS B. COMER

*Attesting Officer*  *Acting Commissioner of Patents and Trademarks*